United States Patent
Shurman et al.

[11] Patent Number: 6,091,832
[45] Date of Patent: Jul. 18, 2000

[54] WEARABLE PERSONAL AUDIO LOOP APPARATUS

[75] Inventors: Daniel Shurman, Palo Alto; Wayne A. Burdick, Belmont, both of Calif.

[73] Assignee: Interval Research Corporation, Palo Alto, Calif.

[21] Appl. No.: 08/909,402

[22] Filed: Aug. 11, 1997

Related U.S. Application Data

[60] Provisional application No. 60/023,830, Aug. 12, 1996.

[51] Int. Cl.$^7$ .................................................. A04R 25/00
[52] U.S. Cl. ................................ 381/381; 2/422; 2/423; 351/123; 379/430; 455/344; 381/370; 381/376; 381/375
[58] Field of Search ........................... 381/370, 374, 381/375, 377, 378, 381, 327, 72, 74; 455/344, 350, 351, 347, 90, 89; 379/430, 432, 433; 351/123; 2/422, 423

[56] References Cited

U.S. PATENT DOCUMENTS

| | | |
|---|---|---|
| 3,586,977 | 6/1971 | Lustig . |
| 4,712,244 | 12/1987 | Zwicker et al. . |
| 4,819,270 | 4/1989 | Lombardo ................................. 381/26 |
| 4,888,805 | 12/1989 | Karppala, Jr. ............................. 381/25 |
| 5,249,001 | 9/1993 | Jannard .................................... 351/123 |
| 5,327,178 | 7/1994 | McManigal ............................. 351/158 |
| 5,465,421 | 11/1995 | McCornick et al. ..................... 455/344 |
| 5,581,821 | 12/1996 | Nakano ........................................ 2/422 |
| 5,606,743 | 2/1997 | Vogt et al. .............................. 455/347 |
| 5,841,859 | 11/1998 | Chen ......................................... 379/433 |

*Primary Examiner*—Curtis A. Kuntz
*Assistant Examiner*—Dionne N. Harvey
*Attorney, Agent, or Firm*—Sierra Patent Group, Ltd.

[57] ABSTRACT

A wearable personal audio apparatus includes one or more wearable U-shaped loop members adapted to fit an individual in a plurality of positions on the individual's body, particularly around the head and neck. The plurality of positions can include positions across the forehead, top or back of the head of the individual, and around the front or back of the neck of the individual. The loop member can have an eyewear receiving member which selectively receives an eyewear insert to provide protective or corrective eyewear when the loop member is worn on the front of the head of the wearer. In one embodiment, a plurality of sets of quick-connect interface ports are disposed around the loop member to selectively receive a plurality of external audio transducer modules. The quick-connect interface ports provide a respective communication path between each of the external audio transducer modules and an audio circuit which can be either external to the loop member or contained within the loop member. In another embodiment, a plurality of internal audio transducers are disposed within the loop member. The internal audio transducers can include audio output devices and/or audio input devices.

68 Claims, 8 Drawing Sheets

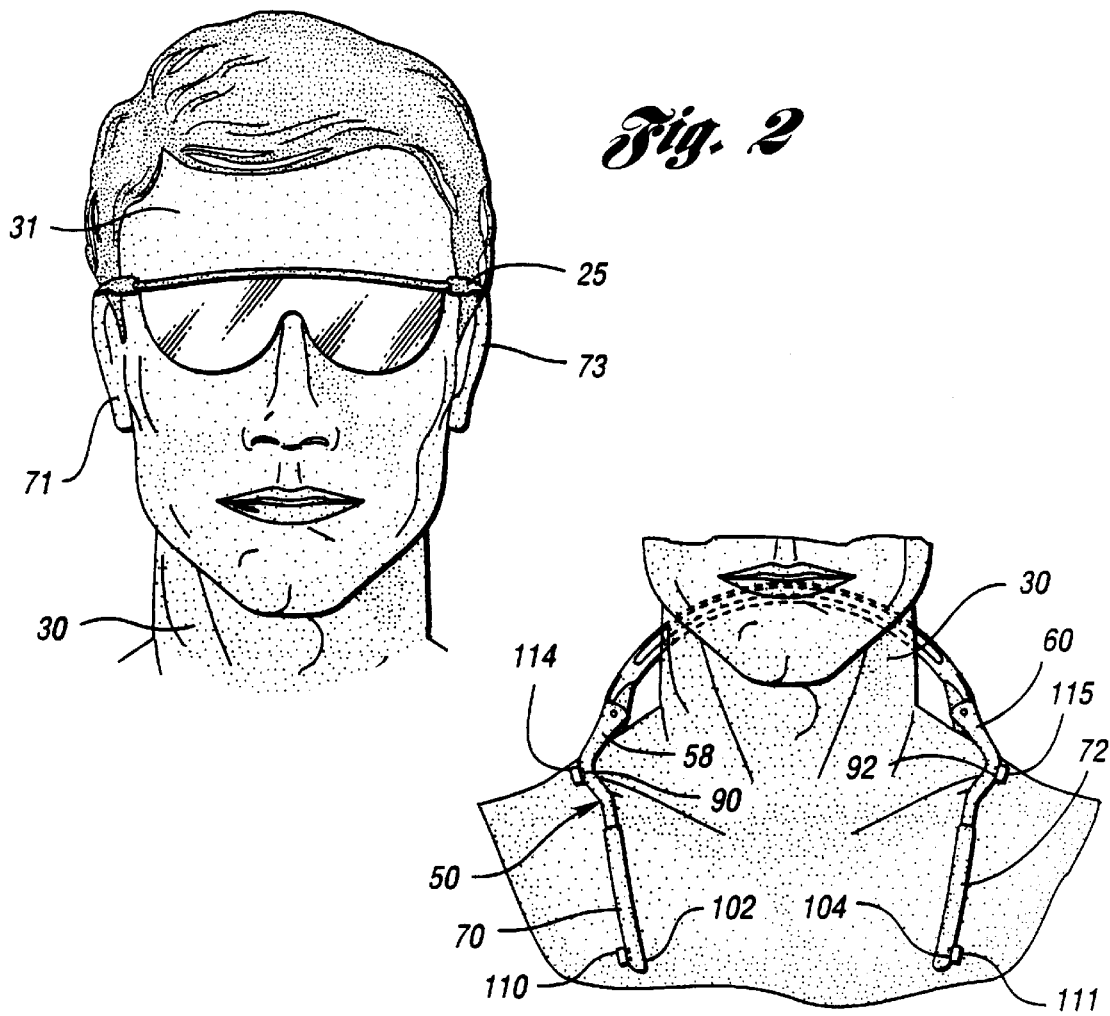
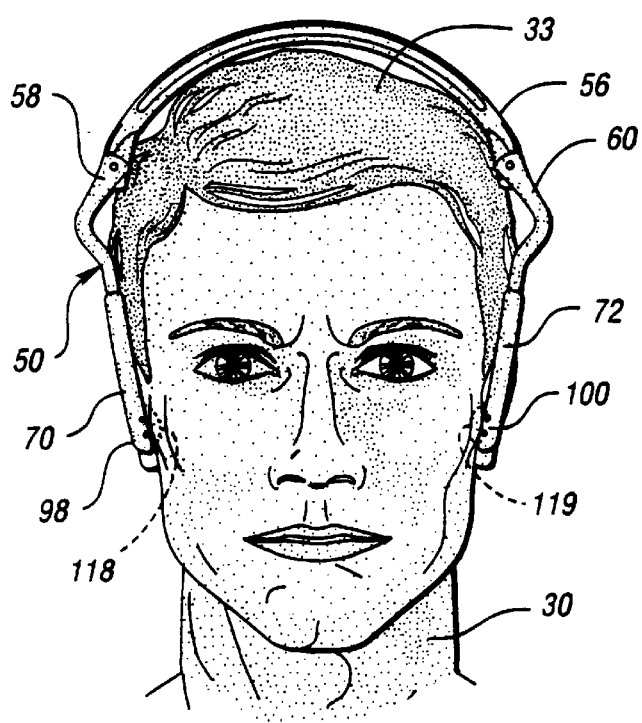

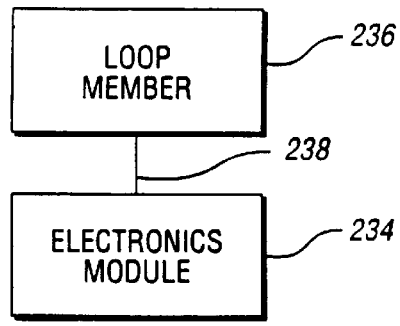
Fig. 12
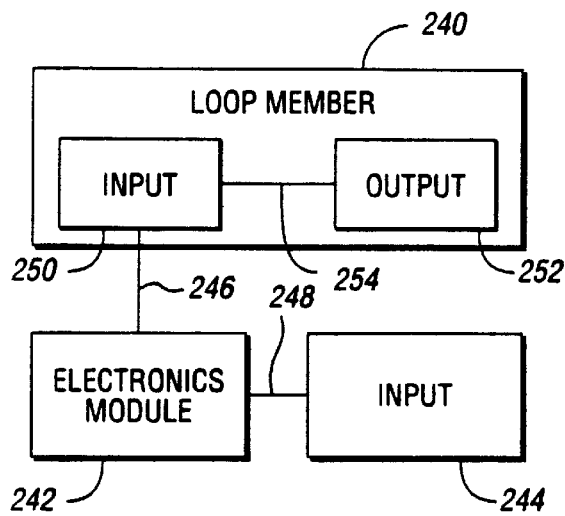
Fig. 13
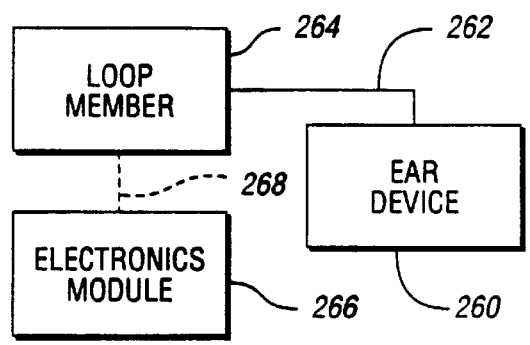
Fig. 14
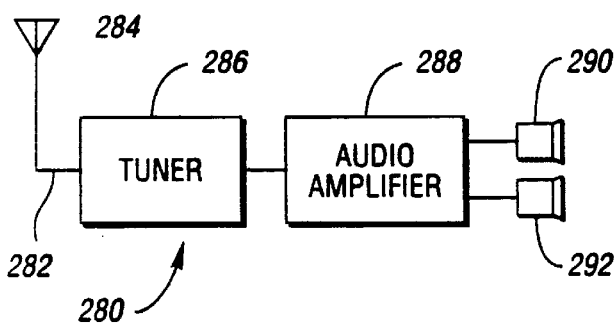
Fig. 15
Fig. 16
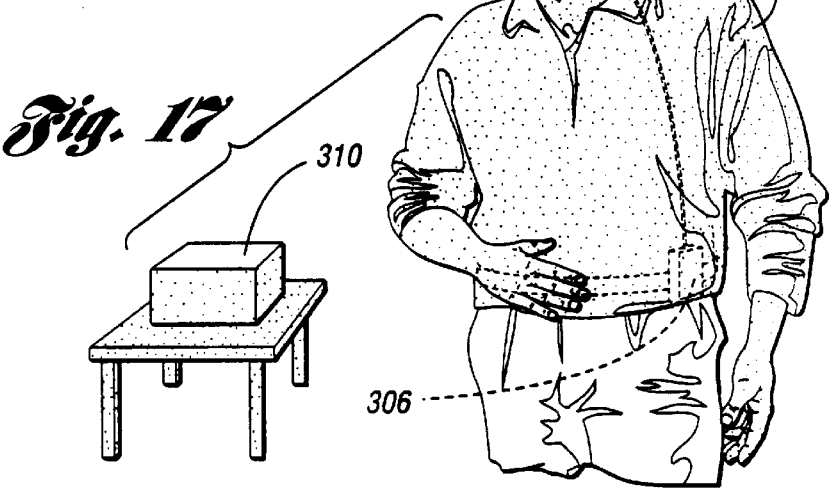
Fig. 17

WEARABLE PERSONAL AUDIO LOOP APPARATUS

CROSS-REFERENCE TO RELATED APPLICATION

This application claims the benefit of U.S. Provisional Application Ser. No. 60/023,830, filed Aug. 12, 1996.

TECHNICAL FIELD

The present invention relates to wearable personal audio systems.

BACKGROUND ART

Portable, personal communications systems, such as cellular telephones and cordless telephones, are currently experiencing a dramatic growth in utilization. Cellular telephones, for example, have enabled users to transcend the constraints of fixed telephony by allowing communication outside of buildings. In accordance with such trends, society will probably witness a significant wireless evolution in both personal and professional communications which will change the way people conduct their lives at home, on the road, and at work.

Numerous personal, portable audio systems are also in use today for conveying music and other audio signals to a wearer. These audio signals can be generated by numerous systems including FM and AM radio, TV, cassette tape players, CD and mini-CD players, MD players and players/recorders, DAT players and players/recorders, CB radios, walkie-talkies, radio scanners and the like. The audio is typically generated by a hand-held or wearable system combined with one or more devices used to convey the sound signals directly to the wearer's ears, such as earphones, headphones, earbuds, etc. These systems typically only convey audio signals to the wearer, do not allow the user to communicate inter-parties with others, and are not versatile or adaptable for multi-system usage.

Some of these personal communication systems include a transmitter-receiver pair along with an audio output and an audio input device. The audio output device typically comprises a speaker, headphones, earphones, or the like. In general terms, audio output devices for use with a personal communication system are devices capable of producing sound waves representative of an electronic audio signal applied thereto, and are employed in contact with or adjacent to the ear of the user. The audio input device typically comprises a microphone or a like transducer. The audio input device produces an electronic signal representative of sound waves received thereby.

Typically, the audio input and output devices are incorporated on a handset, such as a portable cellular telephone. This arrangement is disadvantageous in that a hand of the user becomes occupied during the communication process. Thus, the user of a handset is limited in the types of activities he/she can perform while simultaneously communicating. The audio signals also are monorial, not stereophonic, and typically only provided to one of the user's ears.

In order to obtain a hands-free system with regard to the audio output device, either headphones or earphones may be employed. In some situations, it is disadvantageous to use either headphones or earphones for personal listening since the ears of the user can be partially or entirely covered. Consequently, headphones and earphones act to block sound waves produced within the physical environment of the user, and can be detrimental to activities of the wearer, such as driving a vehicle or operating machinery. Further, wearing a headphone or an earphone for an extended duration of time can be uncomfortable for many people.

Other disadvantages become evident when interaction is attempted between one person and another person wearing headphones. Often, the first person's speaking and social interaction changes when conversing to the other person wearing headphones, or even a hearing aid. Moreover, these social changes are witnessed even when the first person knows that the other person needs the hearing aid.

In order to obtain a hands-free system with regard to the audio input device, a microphone can be located on a headset, such as worn by telephone operators and receptionists. Such an arrangement is also socially disadvantageous when attempting to interact with others in his/her physical space. Further, the use of a headset is conspicuous in public use.

As an alternative to standard headphones and earphones, a number of known personal audio interface systems employ audio output devices which are mounted to eyeglasses. U.S. Pat. No. 4,888,805 to Karppala, Jr. describes a stereo headphone bracket system using socket receivers mounted on each transducer of a pair of stereo headphones and each of two respective eyeglass temples. A piece of semi-rigid wire having on each end a plug matable with a respective socket receiver is used to join the socket receiver on a transducer to the socket receiver on the respective eyeglass temple.

U.S. Pat. No. 5,164,987 to Raven describes a personal stereo speaker assembly adapted to be supported by temple pieces of eyeglasses using a pair of sleeves which receive the temple pieces therein. Secured to each sleeve is an envelope adapted to enclose and support respective standard miniature speakers. The miniature speakers are located approximately at the ear openings of a user.

U.S. Pat. No. 5,272,757 to Scofield et al. discloses a multi-dimensional sound reproduction system having localized speakers supported on a pair of glasses. The speakers are supported in housings disposed on opposite sides of the glasses. Each speaker is located proximate to a respective side of the head of the user in the area of the zygomatic arch, and is directed rearward toward a respective pinna of the user.

As an alternative to a standard audio input device arrangement, U.S. Pat. No. 4,819,270 to Lombardo describes a stereo dimensional recording apparatus utilizing a pair of microphones which can be mounted to separate pieces of eyewear apparel, headwear apparel, and head band accessories.

SUMMARY OF THE INVENTION

It is an object of the invention to provide a wearable personal audio communication device which is an improvement over known personal audio and communication devices and overcomes many of the problems and deficiencies noted above. It is another object of the present invention to provide a wearable personal audio apparatus which can fit an individual in a plurality of different positions on the individual's body, particularly on the head and neck, and still perform its intended functions.

Still another object of the present invention is to provide a wearable personal audio apparatus which can be selectively configured to form either a pair of headphones or a pair of eyeglasses, or both. A further object of the present invention is to provide a wearable personal audio apparatus which is socially acceptable and/or inconspicuous to others.

In carrying out the above objects, the present invention provides a wearable personal audio communication apparatus for use with an audio circuit. The circuit can be positioned in the apparatus itself, separately on the body, or at a base station at the same site or in the same area, and communicate with the wearable apparatus by wire or a wireless communication system. The wearable personal audio apparatus preferably includes a wearable generally U-shaped or C-shaped audio loop member adapted to fit an individual in a plurality of different positions on the individual's body. For example, on the wearer's head, the loop member can be positioned at virtually any position along the front, top and back of the head. Also, the loop member can be positioned on the front or back of the wearer's neck. When positioned on the neck, the loop member could be included within or covered by a wearable garment or the like, if desired. When worn on the head, a sunglass or corrective eyeglass lens could be attached to the loop member so the apparatus could have a real or pseudo secondary use. For this purpose, the loop member can include a slot or other eyewear-receiving member for removably receiving the eyewear insert.

As a one-piece structure, the U- or C-shaped member preferably is flexible and conformable so that it can be adapted to be positioned at any of these locations and be comfortable to the wearer. The loop member also could be sufficiently flexible in order to be folded or rolled-up for storage. When used as a pair of eyeglasses or sunglasses, the loop member preferably has a pair of earpieces or temple members hinged to a front or frame section. When the eyewear insert member is removed, the loop member can be worn as a single C-shaped or U-shaped member.

The loop member contains a plurality of audio input and audio output devices which are appropriately positioned—and can be provided in duplicate sets—in order to provide the requisite audio output to the wearer and receive the audio input from the wearer. The audio devices can be permanently embedded in or be provided as a permanent part of the loop member. Alternatively, a plurality of quick-connect interface ports can be positioned around the loop member to selectively receive a plurality of external audio transducer "plug-in" modules. The audio transducer modules can include audio output devices which produce an acoustic pressure wave in response to an audio signal provided by the audio circuit, or audio input devices which produce an audio signal representative of an acoustic pressure wave received thereby for communication to the audio circuit. For this purpose, a first plurality of quick-connect interface ports is designated for receiving audio output device modules and a second plurality of quick connect interface ports is designated for receiving audio input device modules. The quick-connect interface ports provide a respective communication path between each of the external audio transducers and the audio circuit.

When used as on eyeglass or sunglass embodiment, the quick-connect interface ports are preferably located within each of the two earpieces and positioned adjacent the wearer's ears. These ports are adapted to receive a pair of audio output devices (i.e. transducers or speakers). The pair of audio output devices are proximate to the individual's ears when the loop member is positioned at any of the various locations on the head of the wearer, such as across the forehead, at the hairline, anywhere on the top of the head, at the back of the head, etc. In these configurations, the wearable personal audio apparatus provides a headphone for the user, and can be utilized with or without an eyeglass or sunglass insert member.

The same benefits and advantages of the invention can be secured when the loop member is positioned around the front or back of the neck of the wearer. In these positions, the loop member can be worn openly similar to a necklace or a piece of jewelry, or can be hidden from view, such as being positioned inside the collar of the wearer's garment, under a scarf, or the like.

In order to provide versatility for all of the various positions in which the inventive audio apparatus can be positioned and worn, audio input and output devices or quick-connect ports are provided at various appropriate positions on the loop member. For this purpose, audio output devices or ports are provided on the two opposed side portions or earpieces of the loop member, either in the mid-portion or at the ends thereof, so they will be positioned adjacent the wearer's ears regardless of the position in which the loop member is worn. In addition, audio input devices or ports are positioned at or adjacent to the two ends of the loop member so they will be positioned as close as possible to the wearer's mouth when the loop member is positioned on the back of the head or neck of the wearer.

When the audio input and output devices are embedded or permanently positioned in the loop member, a switching device is preferably provided in order for the wearer to select the appropriate audio input and output devices to be activated, depending on the manner and position that the loop member is worn. The switching device or mechanism is preferably positioned on the loop member. Also, a visible or audible signalling device can be provided on the loop member in order to notify others that the personal communication system in the loop member is in use.

The audio signals to and from the loop member, or between the different or spaced apart audio devices in the loop member, can be provided through direct wires or a wireless system. In this manner, the electronics for the loop member can be provided in a module positioned at another location on the wearer's body, such as in a pocket or on a belt, or positioned in the same room or area. It is also possible in accordance with another embodiment of the invention, to provide a separate pair of ear insert members, such as earrings, which contain the audio output devices. These ear insert members can communicate with the loop member through a wireless system or through wires.

In still another embodiment of the invention, the audio input devices or audio output devices, or both, can be attached to the loop members by extendable wires or small rods and thus be moveable or positionable relative to the loop member in order to be positioned closer to the wearer's ears or mouth. In other embodiments of the invention, each audio input or output device module can consist of two or more transducers (speakers or microphones). Alternatively, two or more audio input or output devices can be provided at each location or quick-connect port on the loop member.

In another disclosed embodiment, the loop member includes a loop receiving member for mounting thereto a similar or "like" loop member from a like wearable personal audio apparatus. Optionally, an interface port is included to connect to a mating interface port of the like wearable personal audio apparatus when the like loop member is mounted in the loop receiving member. The interface port and the mating interface port provide a communication path between the audio circuit and an audio transducer of the two wearable personal audio devices.

Alternatively, a pair of loop members could be provided which are pivotably or rotatably connected together. One of the loop members can contain the audio input devices and the other of the loop members can contain the audio output devices. When this embodiment is positioned on the back of the neck of the wearer, the two loops can be situated in a first position next to each other and hidden from view in the collar or garment of the wearer, or be hinged apart in a second position with the audio input devices adjacent the wearer's mouth and the audio output devices positioned adjacent the wearer's ears. It is also possible for two separate loop members to be provided, one with audio input devices and one with audio output devices, and for the two loop members to be positioned separately at different locations on the wearer's head and neck.

In its simplest form, the present invention could be utilized as a pair of headphones or the like and plugged into an audio or communication device or system, such as a cellular telephone, TV, AM or FM radio, cassette deck, CD-ROM, or the like.

These and other features, aspects, and advantages of the present invention will become better understood with regard to the following description, appended claims, and accompanying drawings.

BRIEF DESCRIPTION OF THE DRAWINGS

FIG. 2 is an illustration of an embodiment of the wearable personal audio apparatus worn across the forehead of an individual;

FIG. 3 is an illustration of an embodiment of the wearable personal audio apparatus worn around the back of the neck of the individual;

FIG. 4 is an illustration of an embodiment of the wearable personal audio apparatus worn around the top of the head of the individual;

FIGS. 12–15 depict various alternative electronic systems for use with the present invention;

FIG. 16 is a schematic diagram of a representative circuit for use with the present invention;

FIG. 17 is a schematic illustration showing use of the present invention with alternative electronic systems;

BEST MODE FOR CARRYING OUT THE INVENTION

In accordance with the present invention, the audio apparatus is preferably provided in the form of a U-shaped or C-shaped structure. Also, there are two basic forms of the loop member in accordance with the preferred embodiments of the present invention: a unitary one-piece loop member; and a three-piece loop member with a front or frame section hingedly attached to a pair of side or earpieces. It is understood, of course, that other shapes and forms of the invention could also be utilized.

Figure 1:
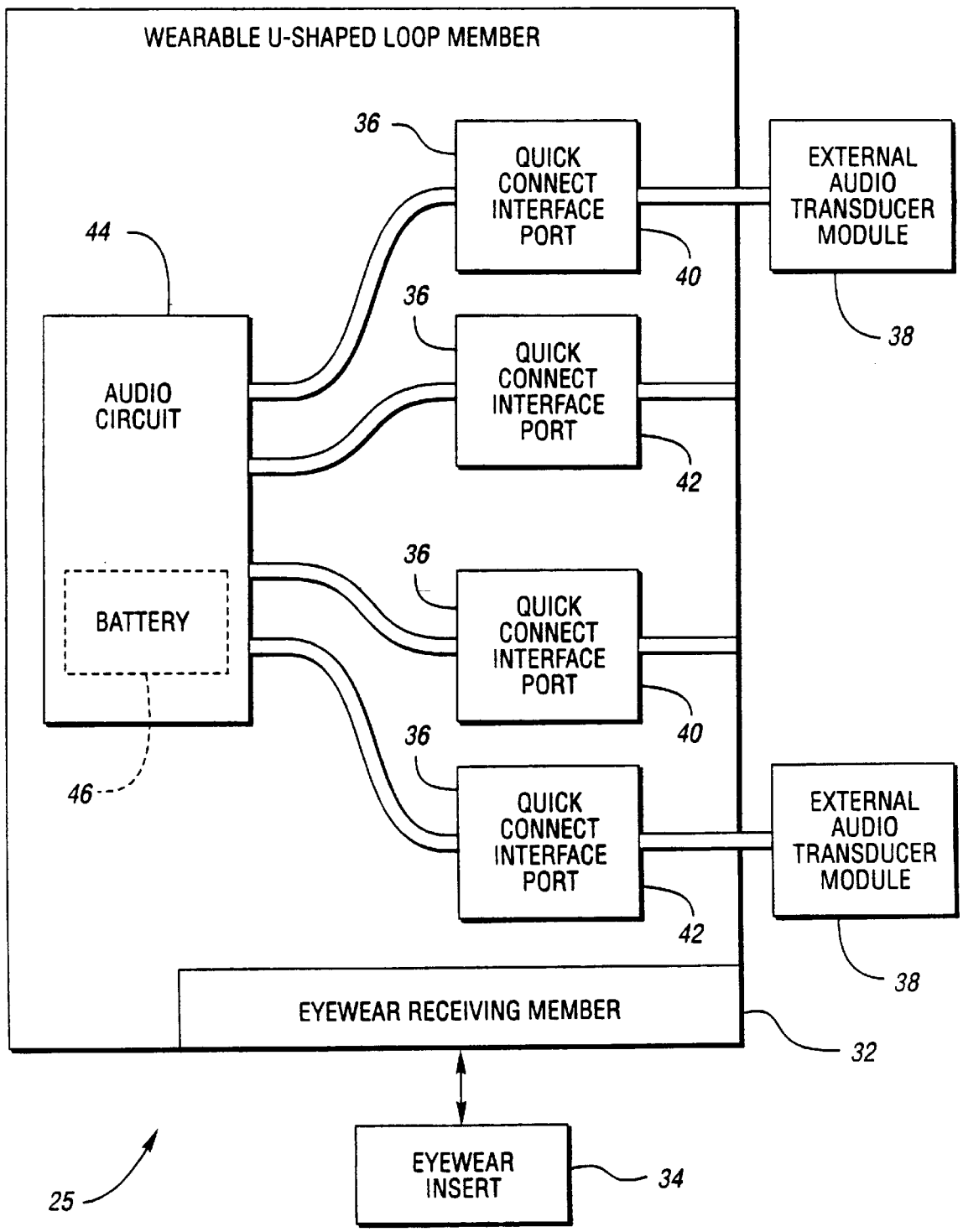
FIG. 1 is a block diagram of an embodiment of a wearable personal audio apparatus in accordance with the present invention.

Turning now to FIG. 1, there is shown a schematic block diagram of one embodiment of a wearable personal audio apparatus in accordance with the present invention. The apparatus includes a wearable, U-shaped or C-shaped loop member 25 (as better shown in FIGS. 3 and 4) adapted to f it an individual in any of a plurality of positions on the individual's body. The plurality of positions includes a position across the forehead of an individual 30 as illustrated in FIG. 2, another position around the back of the neck of the individual as illustrated in FIG. 3, and a further position around the top of the head of the individual as illustrated in FIG. 4. It is obvious in view of the present invention that the apparatus can be positioned at numerous other positions on the wearer's head, neck or other body members, such as at the hairline, on the back of the head, on the front of the neck (like a necklace), etc.

Referring back to FIG. 1, the wearable loop member 25 generally includes an eyewear receiving member 32 which can be adapted to removably receive an eyewear insert member 34. The member 34 can be a corrective lens, a sunglass, a sunscreen, or the like to provide a form of eyewear for the individual. When the eyewear member is attached to the loop member, the loop member can be worn as a regular pair of eyeglasses or sunglasses, as depicted in FIG. 2, or can be positioned on the head, neck, or torso of the individual in any of the other positions where eyeglasses and sunglasses are positioned, transported or worn by individuals today.

The apparatus further includes a plurality of quick-connect interface ports 36 disposed around the loop member 25. The quick-connect interface ports 36 selectively receive a plurality of external audio transducer modules 38. It is not required for all of the quick-connect interface ports 36 to receive a respective one of the external audio transducer modules 38. As illustrated in FIG. 1, the quick-connect interface ports indicated by reference numeral 40 are utilized to receive the external audio transducer modules 38, while the quick-connect interface ports indicated by reference numeral 42 are not coupled to an external audio transducer module.

The quick-connect interface ports 36 are utilized to provide a respective communication path between each of the external audio transducer modules 38 and an audio circuit 44. The audio circuit 44 can be positioned in many locations. It can be contained within the wearable U-shaped loop member 25, as illustrated in FIG. 1. Alternatively, the audio circuit can be located external to the loop member 25 and positioned at other locations on the wearer's body, such as at the waist, in a pocket, on a belt, or at an external site not on the wearer's body, such as on a vehicle, carrying device, or the like.

The audio circuit 44 is typically powered by a battery 46 which can be of any conventional type, but preferably is an exchangeable plug-in or snap-in battery or set of batteries.

The external audio transducer modules 38 can include an audio output device, such as a speaker, which produces an acoustic pressure wave in response to an audio signal provided by the audio circuit 44. The external audio transducer modules 38 may also include an audio input device, such as a microphone, which produces an audio signal representative of an acoustic pressure wave received thereby. The audio signal is communicated to the audio circuit 44 via one of the quick-connect interface ports 36. It is preferred that a first plurality of the quick-connect interface ports be designated only for receiving audio output device modules and a second plurality of the quick-connect interface ports be designated only for receiving audio input device modules.

Figure 5:
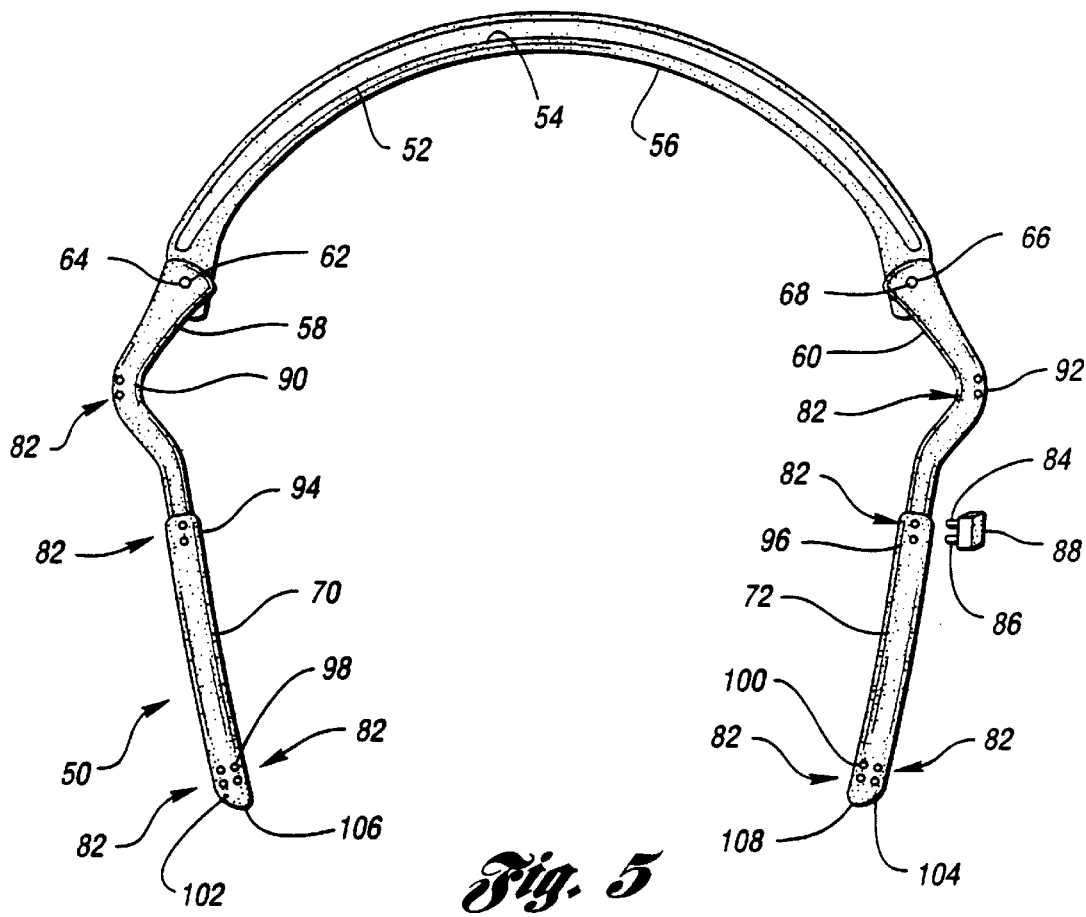
FIG. 5 is a bottom view of an embodiment of the wearable personal audio apparatus depicting the quick-connect ports.

Turning now to FIG. 5, there is shown a bottom view of a quick-connect-type embodiment of the wearable personal audio apparatus in accordance with the present invention. A wearable U-shaped loop member, generally indicated by reference numeral 50, includes an eyewear receiving member or slot 52 for selectively receiving an eyewear insert. In this embodiment, the eyewear receiving member 52 defines a single lens-receiving slot 54 for receiving an eyewear insert in the form of a single lens or a single pane (as shown, for example, in FIG. 2).

The eyewear receiving member 52 is disposed on an arcuate front or frame portion 56 of the loop member 50. A pair of side support members 58 and 60 are jointed to the arcuate member 56 to form the U-shape of the loop member 50. In the illustrated embodiment, the side support member 58 includes a receiving hole 62 which receives a hinge pin 64 of the arcuate member 56. Similarly, the side support member 60 defines a receiving hole 66 which receives a hinge pin 68 of the arcuate member 56. The pin receiving holes 62 and 66 cooperate with the hinge pins 64 and 68 to form hinges for jointing the side support members 58 and 60 to the arcuate member 56.

The side support member 58 includes an earpiece 70, and the side support member 60 includes an earpiece 72. The two earpieces 70 and 72 are adapted to rest on the ears of the individual when the loop member is worn around the forehead (as shown in FIG. 2). In FIG. 2, the individual is generally indicated by the reference numeral 30 and is wearing the loop member around his forehead 31. The two earpieces 70 and 72 rest upon upper portions of the individual's ears 71 and 73.

Referring again to FIG. 5, there is shown a plurality of quick-connect interface ports 82 disposed around the loop member 50. In this embodiment, each of the quick-connect interface ports 82 includes two receiving holes for receiving two external pins 84 and 86 of a representative external audio transducer plug-in module 88. As stated earlier, the external audio transducer module 88 can include either an audio output device (i.e. a speaker) or an audio input device (i.e. a microphone). In loop member 50, quick-connect interface ports indicated by reference numerals 90, 92, 94, 96, 98, and 100 are designated for receiving audio output device modules. The remaining quick-connect interface ports indicated by reference numerals 102 and 104 are designated for receiving audio input device modules (microphones).

The quick-connect interface ports are located near or at the ends 106 and 108 of the earpieces 70 and 72. The ports 102 and 104 are positioned on the earpieces 70 and 72 so that when the loop member is worn around the back of the neck of the individual, such as shown in FIG. 3, the quick-connect interface ports 102 and 104 are located on generally opposite sides of the neck and are proximate to the individual's collarbone. In this manner, microphones positioned in the ports 102 and 104 will be situated close to the mouth of the wearer.

When the loop member is worn in the position shown in FIG. 3, another pair of the quick-connect interface ports, indicated by reference numerals 90 and 92, are located on the side support members 58 and 60. These ports are designated for receiving audio output device modules (speakers). When the loop member is worn around the back of the neck of the individual, interface ports 90 and 92 with speakers therein are located on generally opposite sides of the individual's neck close to the wearer's ears.

A pair of audio input devices 110 and 111 are plugged into the quick-connect interface ports 102 and 104, respectively, and a pair of audio output device modules 114 and 115 are plugged into the quick-connect interface ports 90 and 92, respectively. The placement of the audio input device (microphone) modules 110 and 111 on either side of the individual's collarbone provides for a continuous, spatially correct capture of the stereo image of the individual's speech, and more generally, the sounds which are produced in the wearer's physical space. The audio output device (speaker) modules 114 and 115 are located on generally opposite sides of the individual's neck and are positioned rearwardly from the individual's collarbone. The use of the pair of audio output device modules on either side of the neck provides a capability for producing a spatialized stereo audio environment for the individual.

With reference again to FIG. 5, the quick-connect interface ports indicated by reference numerals 98 and 100 are located on inner portions of the two earpieces 70 and 72. The ports 98 and 100 are adapted to receive a pair of audio output device modules when the loop member is worn around the top of the head of the individual. This is illustrated in FIG. 4, wherein an individual 30 is shown wearing the loop member 50 around the top of his head 33. The arcuate center section 56 of the loop member 50 is positioned on the top of the head and the side support members 58 and 60 deform sufficiently to fit around the individual's head. As such, it is preferred that the side support members and the arcuate center member be formed from a resilient material, such as plastic—although the final choice of materials should be left to the designers.

When worn in the manner shown in FIG. 4, the earpieces 70 and 72 extend approximately to the center of the ear canals of the individual. In this regard, the side support members and/or earpieces can have adjustment mechanisms incorporated therein so that the axial longitudinal length of the side support members can be changed in order to fit the wearer. Any of the known adjustment mechanisms for adjusting the length of eyeglass temples could be utilized. The quick-connect interface ports 98 and 100 have a pair of audio output device modules (speakers) 118 and 119 positioned in them. The modules 118 and 119 are located proximate to the individual's ears, and more specifically, proximate to the ear canals of the individual when the loop member is worn around the head. As a result, a headphone-like configuration can be provided using embodiments of the present invention.

Figure 6:
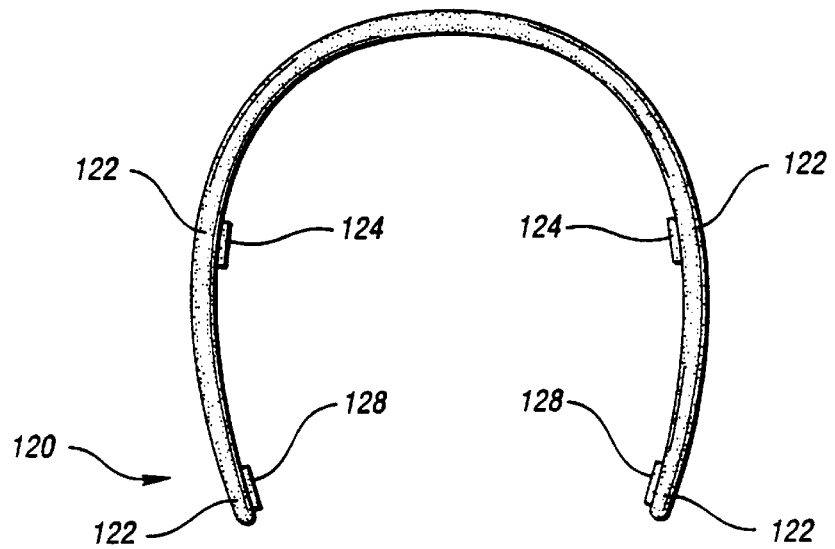
FIG. 6 depicts a one-piece loop member in accordance with the present invention.

In another preferred embodiment of the invention, the loop member 120 is provided as a single unitary C-shaped or U-shaped structure. This is shown in FIG. 6. Preferably, the member 120 is flexible and conformable so that it can be adapted to be comfortably positioned at any location on the head or neck of the wearer. In order to be as socially acceptable and inconspicuous as possible, the loop member 120 has a relatively small cross-sectional size, on the order of ⅛ to ½ inches on a side. In this regard, the cross-section of the loop member in accordance with any of the embodiments of the invention can have any configuration, such as round, elliptical, square, kidney-shaped, or the like.

The one-piece loop member 120 (FIG. 6) preferably has a plurality of quick-connect ports 122 of the same type and purpose as those described above with reference to FIGS. 3, 4 and 5. These ports allow placement of portable replaceable audio input and audio output devices as desired by the wearer. In FIG. 6, audio output devices (speakers) 124 and 125 are shown, as well as audio input devices (microphones) 128 and 129.

For ease of transporting and storing the loop members of the present invention, it is also possible for the loop member to be folded into halves, thirds, fourths, etc., depending on the materials utilized for the loop member and circuitry and the number of elastic or flexible joints provided along its length.

Figure 7:
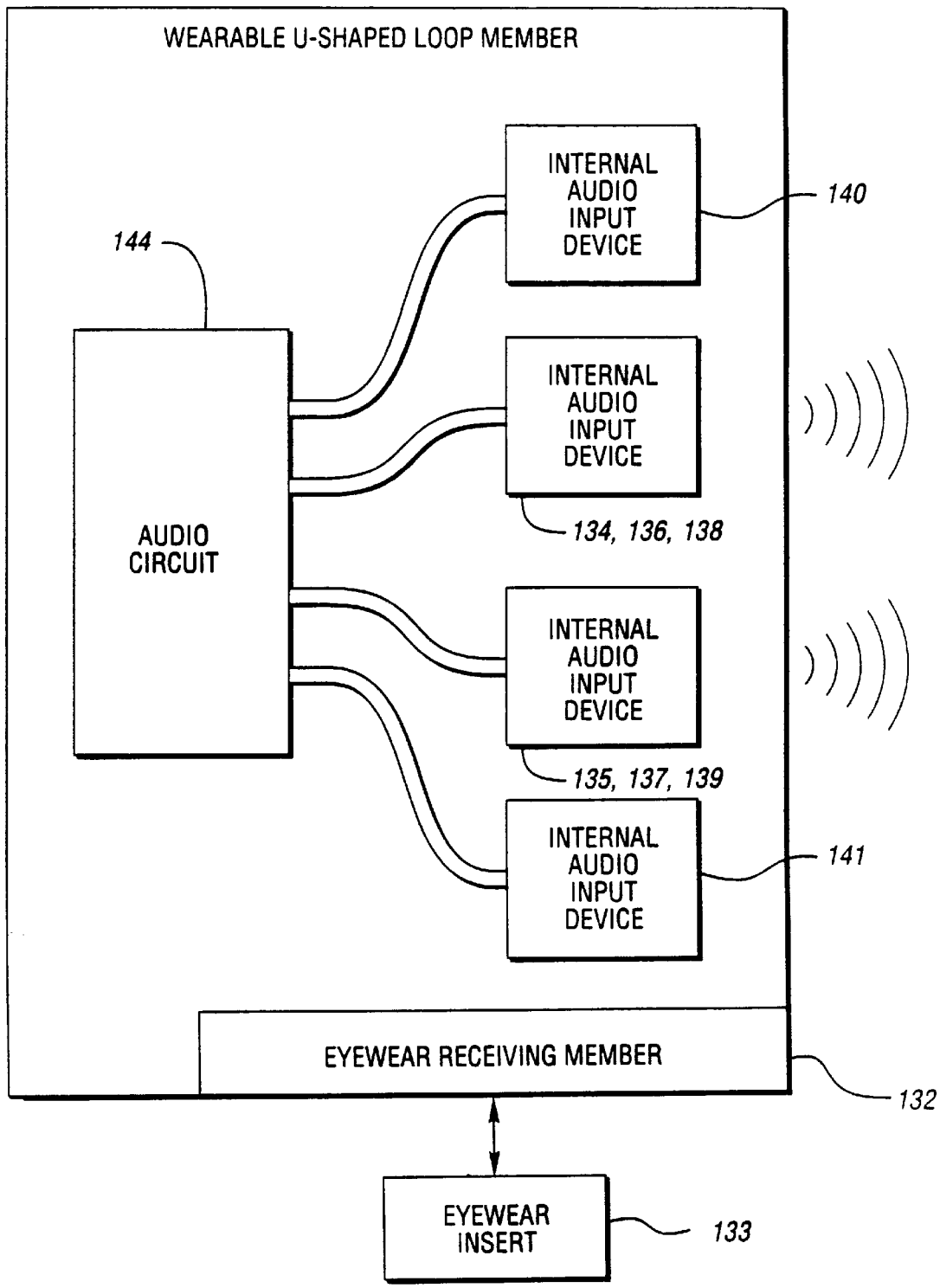
FIG. 7 is a block diagram of an alternative embodiment of the wearable personal audio apparatus.
Figure 8:
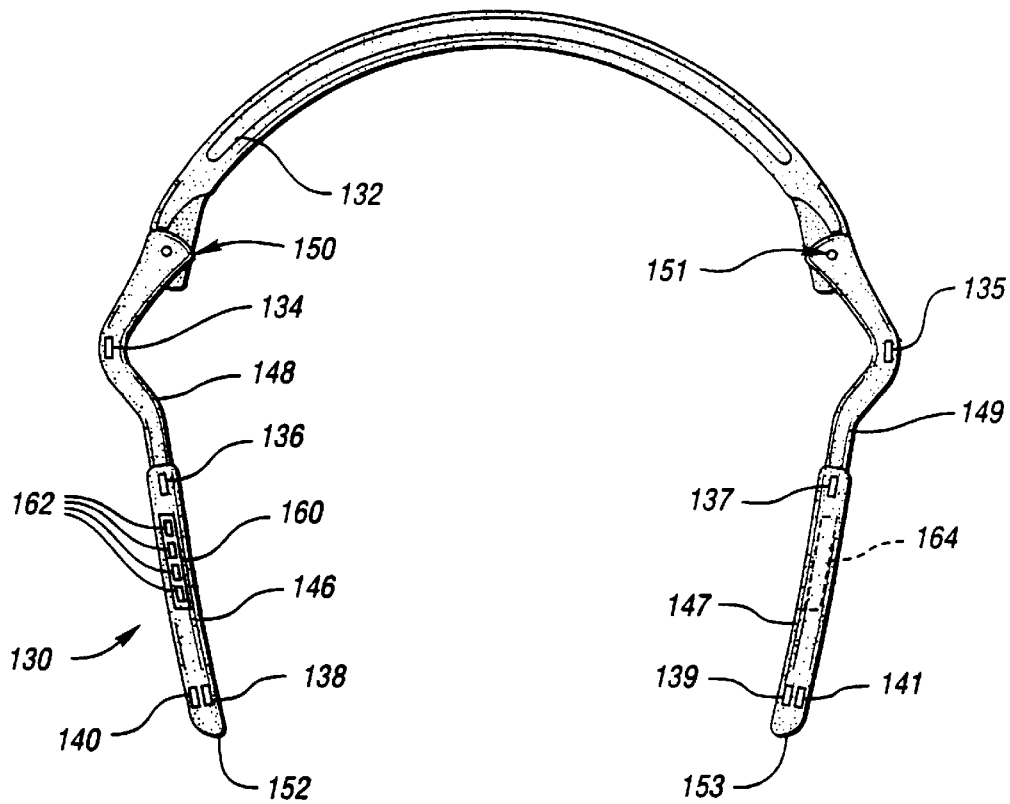
FIGS. 8 and 8A illustrate additional alternative embodiments of the invention.

Turning now to FIGS. 7 and 8, an alternative embodiment of a wearable personal audio apparatus is depicted in accordance with the present invention. FIG. 7 is a block diagram of this embodiment, while FIG. 8 depicts the structure thereof. This embodiment 130 includes a wearable U-shaped loop member 130 (as shown in FIG. 8) which is adapted to fit an individual in a plurality of positions on the individual's body, particularly on the head and neck. Included in the loop member 130 can be an eyewear receiving slot or member 132 which selectively receives an eyewear insert 133 to provide eyewear when the loop member is worn around the forehead of a wearer.

Instead of utilizing quick-connect interface ports as described above, the apparatus as depicted in FIGS. 7 and 8 includes a plurality of internal audio transducers embedded or permanently positioned within the loop member 130. The embedded internal audio transducers include at least one audio output device and at least one audio input device. For the purpose of illustration, the internal audio transducers include internal audio output devices 134 and 135, 136 and 137, and 138 and 139, and internal audio input devices 140 and 141. The audio output devices (i.e. speakers) produce acoustic pressure waves in response to audio signals provided by an audio circuit 144 (see FIG. 7). The audio input devices 140 and 141 produce audio signals representative of acoustic pressure waves received thereby, and communicate these audio signals to the audio circuit 144. Although the audio circuit 144 is illustrated to be within the loop member 130, it is, as explained above, within the scope of the present invention, for the audio circuit to be located external to the loop member and positioned at another location on the wearer's body or in the wearer's immediate area.

FIG. 8 is a bottom view illustrating the wearable personal audio apparatus 130. The pair of embedded internal audio input devices 140 and 141 are located at the ends of earpieces 146 and 147. The pair of embedded audio output devices 134 and 135 are located within side support members 148 and 149. When the loop member is worn around the back of an individual's neck, the audio input devices 140 and 141 are located on generally opposite sides of the neck and are proximate to the individual's collarbone. In this position, the audio output devices 134 and 135 are also located on generally opposite sides of the neck, but rearwardly from the individual's collarbone.

The pair of embedded audio output devices 138 and 139 are located at the ends of the earpieces 146 and 147. When the loop member is worn around the top of an individual's head, the audio output devices 138 and 139 are positioned proximate to the individual's ear canals In this position, the apparatus acts as a headphone.

The other pair of embedded audio output (speaker) devices 136 and 137 are contained either within the side support members 148 and 149 or within the earpieces 146 and 147. The audio output devices 136 and 137 are located approximately mid-way between joints 150 and 151 and the ends 152 and 153 of the loop member 130. The audio output devices 136 and 137 are utilized for personal listening when the loop member is worn on an individual's forehead, either at the eyebrows, at the hairline, etc.

In order for the wearer to activate the embedded audio transducer devices and select which devices are necessary when the loop member is worn in a certain position, a switching mechanism 160 is provided. The mechanism 160 can be provided at any convenient position or orientation on the loop member 130. The mechanism 160 includes a plurality of switches or push buttons 162 which are set up to activate/deactivate the various audio transducer devices in th e loop member. The switches or buttons 162 could also be utilized to adjust the volume of the audio input and output of the loop member.

Alternatively, it is also possible to provide position sensors, such as liquid or mercury switches, in the loop member which would be set up to only activate certain quick-connect ports or embedded audio transducer devices, depending on the orientation and position of the loop member. A mercury switch 164 is shown, for example, in phantom lines in FIG. 8.

Figure 8A:
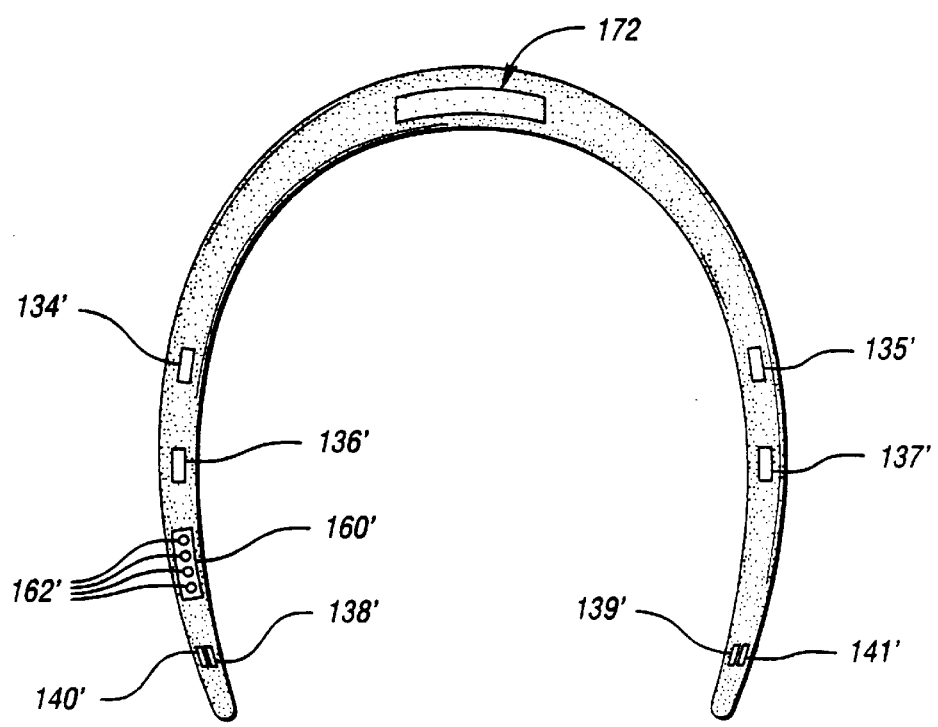

FIG. 8A depicts another embodiment of the invention in which the audio input and output devices are embedded in a one-piece C-shaped loop member 170. Similar to the embodiment shown in FIG. 6, the loop member 170 is flexible and conformable, preferably has a socially inconspicuous size and shape, and is adapted to be positioned at virtually any location on the wearer's head or neck and still provide audio output to the wearer and receive audio input from the wearer. A plurality of embedded audio transducer members 134', 135', 136', 137', 138', 139', 140' and 141' are provided in the same locations and for the same purposes as those described above with reference to FIG. 8. Also, the loop member 170 has a switching mechanism 160' for selectively activating the embedded audio transducer members.

Figure 18:
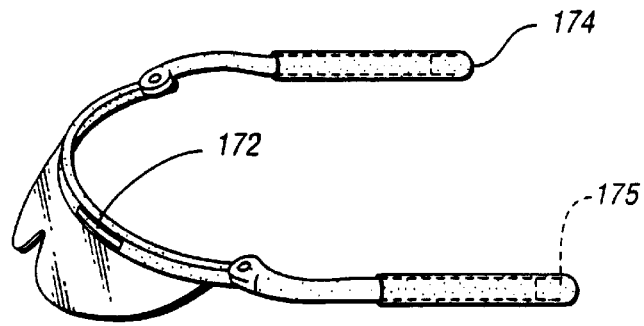
FIG. 18 illustrates a visual signalling mechanism for use with the present invention.

In some instances, it is also desirable to provide notice or a signal to others that the wearer is engaged in a telephone conversation, or does not want to be interrupted while the audio components of the loop member are in use. For this purpose, a visual signaling indicator 172 can be provided, as shown in FIGS. 8A and 18. The indicator 172 is preferably positioned where it can be seen by others, and it is possible for more than one indicator to be provided (as shown in phantom lines by indicators 174 and 175 positioned at the ends of the loop member in FIG. 18).

The indicator 172 can be one or more LEDs, or one or more small LCD panels, or similar visual displays. The indicator could display various graphics, symbols, icons, or the like in order to more specifically advise others as to the strength, existence or type of communications being employed at that time. The indicator could simply be a light, a flashing light, a glowing word, or a group of words (such as "ON THE AIR", etc.). The visual indicator could also be used to signal the strength of the audio input and/or output, or the remaining life of the battery. Alternatively, an audio indicator, such as a "beep", could be provided directed outwardly so others would be advised that the wearer of the loop member was "occupied" at that time.

Activation of the indicator 172, whether by visual or audio commands, could be automatic when the audio system in the loop member is activated, or the indicator could be operated by one of the switches/buttons 162, 162' in the switch mechanisms 160, 160' (see FIGS. 8 and 8A).

Figure 9:
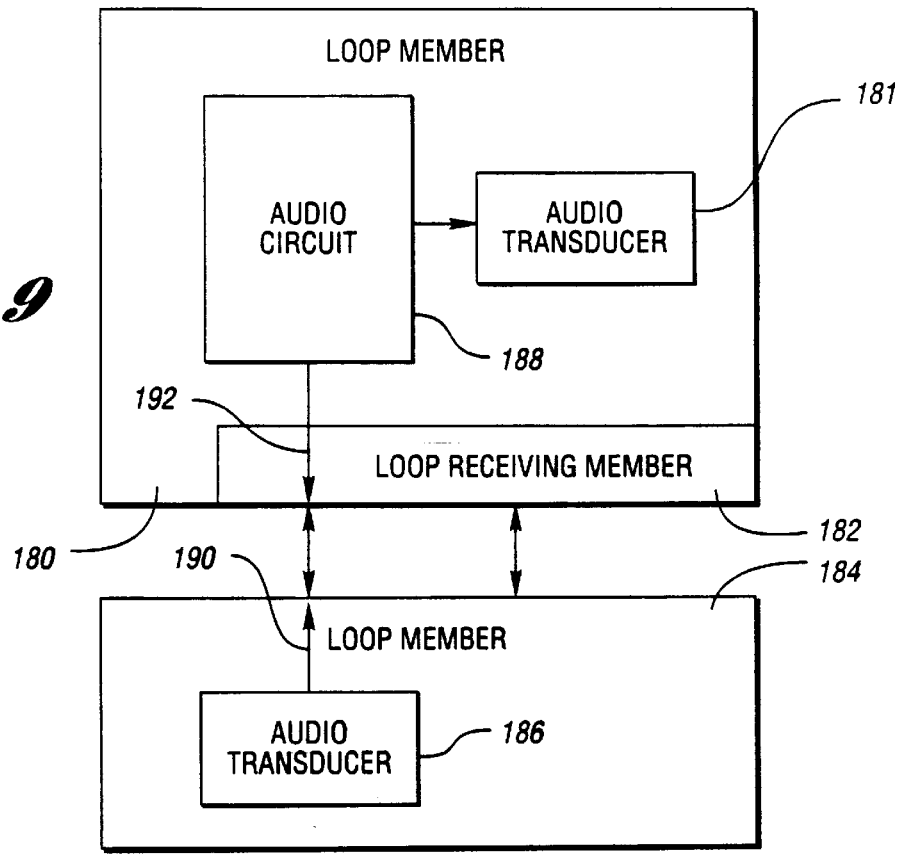
FIG. 9 is a block diagram of an embodiment which allows multiple loop members to be stacked.

FIG. 9 is a block diagram of an embodiment which allows multiple loop members to be stacked one on top of the other. A first loop member 180 capable of stacking includes a loop receiving member 182. The loop receiving member 182 allows a second loop member 184 to be mounted thereto or thereon. Optionally, an audio transducer 186 associated with the second loop member 184 communicates with an audio circuit 188 associated with the loop member 180 when the second loop member 184 is mounted to the loop receiving member 182. This can be facilitated by including an interface port 190 which connects to a mating interface port 192 when the second loop member 184 is mounted to the loop receiving member 182. The connection of the mating interface ports 190 and 192 provides a communication path between the audio circuit 188 and the audio transducer 186. The loop member 180 also has its own audio transducer 181.

A stacking configuration of loop members can be utilized, for example, when one wearable audio apparatus only provides audio output devices and another wearable audio apparatus only provides audio input devices. In this instance, the wearer can switch from a receive-only mode with a single personal audio apparatus, to a receive-and-transmit mode by stacking or mounting a second personal audio apparatus thereon. For this purpose, one of the loop members preferably would have at least one set of audio speakers mid-way in the side portions of the loop and the other loop member preferably would have audio microphones at the ends of its side portions.

Figure 10:
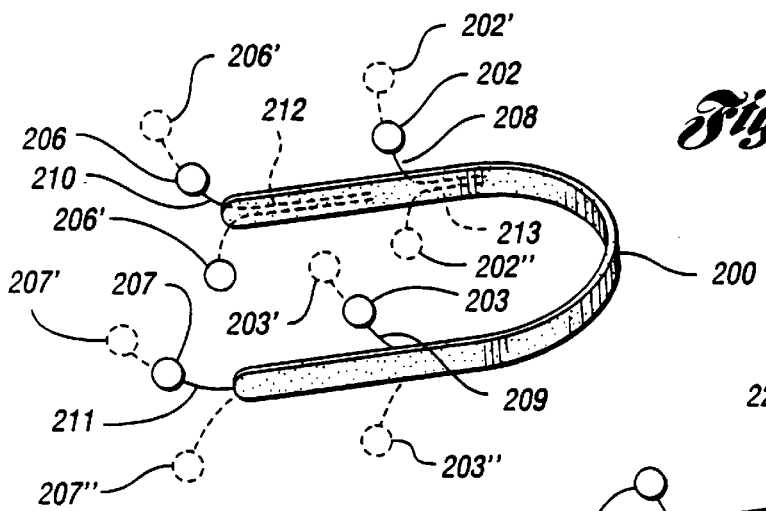
FIG. 10 illustrates an embodiment of the invention with selectively positionable audio input and output devices.

FIG. 10 shows an alternate embodiment of the present invention in which the audio input and output devices can be selectively positioned as desired by the wearer. For this purpose, the audio input and output devices are connected to thin wires or rods which are retractably positioned in the loop member. In FIG. 10, the loop member is indicated by the reference numeral 200, the audio output devices (speakers) are indicated by the reference numerals 202 and 203 and the audio input devices (microphones) are indicated by reference numerals 206 and 207. The audio devices 202, 203, 206 and 207 are connected to the loop member 200 by thin wires or rods 208, 209, 210 and 211, respectively. The elongated rods or wires are positioned in elongated channels or conduits 212 and 213 in the loop member 200 so that the audio devices can be positioned further from the loop member when desired by the wearer. In this manner, the microphones 206 and 207 can be positioned closer to the wearer's mouth for privacy or security and, similarly, the speakers 202 and 203 can be positioned closer to the wearer's ear canal for improved listening of the audio signals produced by the invention.

As shown in phantom lines 202', 203', 206', and 207' in FIG. 10, the audio devices can be located at various positions and distances relative to the loop member 200. When it is not desired to position the audio devices at distances from the loop member, the wires 208, 209, 210 and 211 can be retracted into the loop member, thus positioning the audio devices immediately adjacent the outside of the loop member.

In the description of the present invention, the terms speaker, microphone, transducer, audio input device and audio output device are referred to primarily in the singular. However, in accordance with the present invention, one or more transducers can be utilized for each of these terms and, thus, for purposes of the present invention, these terms should be interpreted as applying to one, two or more transducer devices in each instance. In this regard, arrays of tiny transducers or small specialized speakers can often be used to reproduce sounds with improved acoustics, such as dynamic range, frequency response and ability to spatialize music in the near ear and in-ear positions. In addition, silicon microphones can be utilized in place of standard or conventional transducers and other audio devices in accordance with the present invention.

Figure 11:
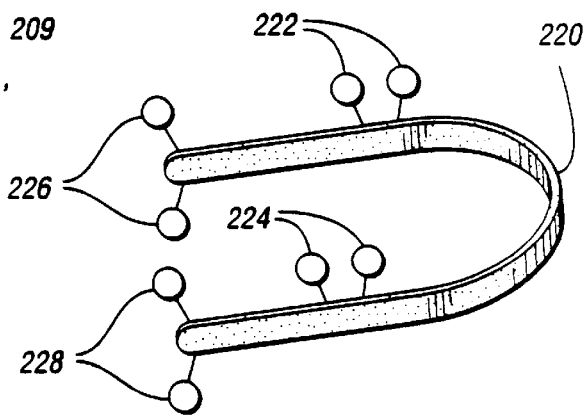
FIG. 11 illustrates an embodiment of the invention with pairs of transducers forming each of the audio input and output devices.

In FIG. 11, an embodiment of the present invention is shown in which pairs or sets of audio devices are utilized in each of the audio input/audio output positions of the embodiments described above. For example, the loop member 220 shown in FIG. 11 has pairs of audio output devices (speakers) 222 and 224 at mid-point positions along the sides of the loop member. In addition, pairs of audio input devices (microphones) 226 and 228 are positioned at or adjacent the ends of the loop member. The pairs of audio transducer devices shown in FIG. 11 are merely representative of sets or arrays of audio devices which can be utilized at the various locations and positions on the loop member in accordance with the present invention.

As indicated above, the audio circuitry used with the loop member can be positioned in the loop member itself or positioned in a separate electronics module positioned external to the loop member. The electronics also can be connected to the transducers in the loop member by a hard wire form or through a wireless communication system. Representative systems depicting some of the various embodiments of the present invention in this regard are shown in FIGS. 12–15.

FIG. 12 depicts an embodiment 230 of the invention where the audio circuitry and electronics are positioned in the loop member itself. In this regard, the audio circuitry and electronics can communicate with the audio transducer devices in the loop member, either through wires or a separate wireless communication system in the loop itself.

In FIG. 13, the electronics module 234 is positioned separately from the loop member 236. The module 234 and loop member 236 are connected by a wire member 238. Alternatively, the loop member and electronics module could be connected by a wireless communication system to the electronics module in order to dispense with visible wires positioned on the head or neck of the individual.

In this regard, the electronics module 234 could be positioned at various locations on the wearer's body, such as at the waist, in a pocket or in a garment of some type. When the electronics module is positioned at the waist of the wearer, it can be attached to the wearer's belt or incorporated into a waist pack of some type. Moreover, it is possible to position the electronics module at a base station in the same room or area as the individual and thus not on the individual's body.

In FIG. 14, the loop member 240 has an electronics module 242 positioned at a separate location and the electronics module in turn receives input from a separate input device or system 244. The communication conduits 246 and 248 between the electronics module and the loop member, and the input mechanism and the electronics module, respectively, can be either hard wires or wireless communication systems. It is also possible in the loop member 240 to separate the input device 250 from the output device 252 with the communication connection 254 between them being by wire or a wireless communication system.

In accordance with the present invention, it is possible for the electronics module to comprise one or more of the various communication systems in conventional use today. These include FM and AM radio devices, televisions, cassette tape players, CD and mini-CD players, MD players and players/recorders, DAT players and players/recorders, CB radios, walkie-talkies, radio scanners, and the like. With most conventional audio devices of this type, the electronics module will be connected to the loop member by a plug-in jack mechanism connected to a wire member.

Various other types of audio circuits and devices could be used in connection with the present invention. These include transmit and/or receive circuits, mixer circuits, equalization circuits, digital sound processing circuits, broadcast FM receive circuits, broadcast TV receive circuits, and the like. The loop member could be modified to include quick-connect ports for one or more of these various circuit devices or the circuit devices could be incorporated into the electronics module that is utilized with the loop member.

FIG. 15 shows still another embodiment of the present invention which utilizes an ear device or earpiece 260, such as an earring or the like, which is connected by wire or a wireless communication system 262 to the loop member 264. One or more audio output (speaker) devices are positioned in the earpiece 260 which is attached to the ear or suspended from the inner part of the ear. The electronics module 266 which provides the audio signals to the loop member can be hard wired or connected by a wireless communication system 268 to the loop member which in turn provides the audio signals to the transducers in the ear device 260.

As is evident from the above description of the invention, the C-shaped or U-shaped loop member utilized in the audio system in accordance with the present invention essentially comprises a "bus" which allows audio input and output devices to communicate with each other, for the audio input and output devices to communicate with the electronics module, and for the loop member to communicate with various other audio circuitry devices.

A representative circuit 280 for use with the present invention is shown in FIG. 16. Audio signals 282 from antenna 284 are received by tuner 286 and amplified by audio amplifier 288. Audio signals from the amplifier are sent to stereo audio output devices 290 and 292. Also, input audio signals from microphone 294 are sent to the amplifier 288.

When the microphone signals exceed a preset level, the audio amplifier mutes the output for a preset time. The stereo output signals go to the internal audio output devices or to the quick-connect interface ports, whichever are present.

FIG. 17 is a schematic illustration of an individual wearing the present invention. The individual is indicated by the reference numeral 300 and is wearing a C-shaped or U-shaped loop member 302 on his forehead. The loop member has an eyeglass member 304 attached to it and the audio devices in the loop member are connected by a wireless communication system to an electronics module 306 situated at the individuals waist. The individual is also wearing an earring 308 which contains the audio output devices which receive audio signals from the loop member and convey them to the individual's ear.

Also shown in FIG. 17 is a separate electronics module 310 positioned in the same general area as the individual 300. The electronics module 310 can be used in place of the electronics module 306 which is positioned on the individual, and can transmit audio signals to the loop member 302 by wire or a wireless communication system.

In accordance with the present invention, it is also possible for the individual to utilize two or more audio systems simultaneously in the loop member. In this manner, the individual can listen first to music or other audio signals conveyed to the loop member and the audio output devices by, for example, a CD player or cassette player. At the same time, the individual could carry on a cellular telephone conversation through the audio input and output devices with one or more other persons. Depending on the circuitry in the loop member and electronics module and the appropriate switching and mixing mechanisms, the individual could keep the music and telephone conversation separate, or allow the music to be conveyed to and shared by the other person through the audio input device.

Figure 19:
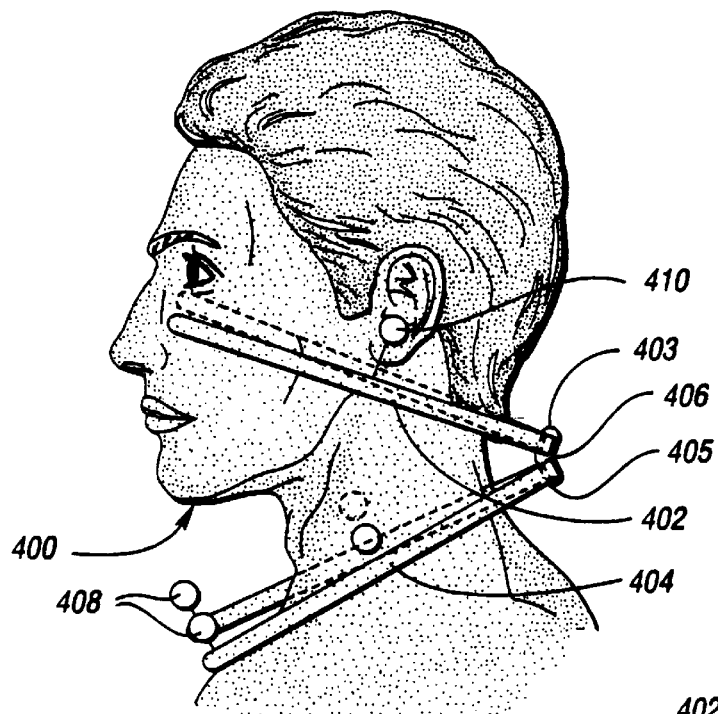
FIGS. 19–21 illustrate alternate embodiments of the invention utilizing two loop members.
Figure 20:
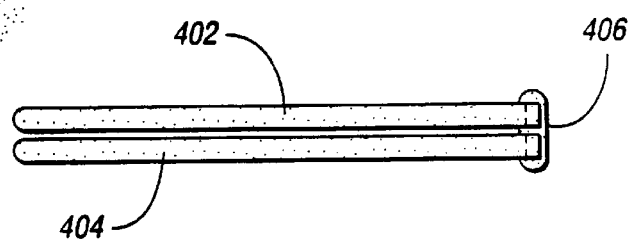
Figure 21:
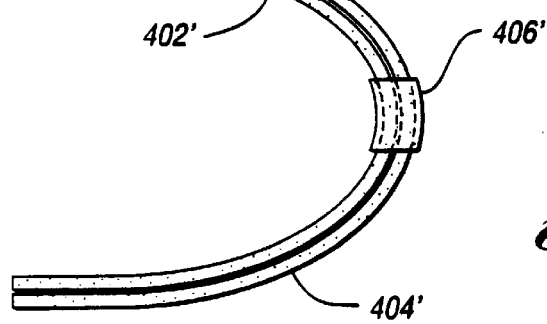

FIGS. 19–21 illustrate other embodiments of the present invention which utilize pairs or sets of loop members. As shown in FIG. 19, a pair of loop members 402 and 404 are attached together at their midpoints 403 and 405, respectively, by an appropriate hinged or pivotal connecting mechanism 406. In this regard, the two loop members 402 and 404 can be connected one on top of the other as shown in FIG. 20, or concentrically one inside the other as shown in FIG. 21.

In the two-loop member embodiment 400 shown in FIG. 19, one of the loop members 404 contains a pair of audio input devices 408 at or adjacent to the ends thereof. The second loop member 402 contains at least a pair of audio output devices 410 along the two sides of the loop member in order to provide audio signals to the wearer's ears. In this manner, when the device 400 is positioned on the back of the neck of the wearer, the loop member 404 can be positioned such that the wearer's sounds will be picked up by the audio input devices 408 and, at the same time, the loop member 402 can be positioned such that the audio output devices 410 will provide audio signals to the wearer's ears.

The two loop members 402 and 406, as depicted in FIG. 19, could also be utilized as separate loop members (i.e., without the use of connecting mechanism 406). The two loop members could be positioned at different locations on the wearer. For example, loop member 402 could be positioned around the front, back or top of the head of the wearer and have the audio output devices located so as to provide audio signals to the wearer's ears. At the same time, the loop member 404 with the audio input devices 408 thereon could be positioned around the individual's neck or in a garment collar in order to pick up sound signals emaninating from the wearer's mouth.

With the electronics module positioned at another location on the wearer's body, such as a belt-worn device, other adjustment mechanisms could be utilized which would allow the user to adjust the volume, fidelity, etc., of the audio input and output to the loop member. The electronics module could also allow the user to mix the audio output with the audio input.

The above-described embodiments of the present invention have many advantages. By utilizing a wearable U-shaped loop member, embodiments of the wearable personal audio apparatus can fit an individual in any of a plurality of positions on the individual's body, particularly on the individual's head and neck. Further, the wearable personal audio apparatus can be worn in a manner which is socially inconspicuous to others. For example, the wearable personal audio apparatus can be worn around the forehead or front of the head of an individual along with an eyewear insert in order to appear to be a pair of eyeglasses or sunglasses. Embodiments of the present invention can also be worn around the top of the head of the individual in a manner similar to headphones. Further, embodiments in accordance with the present invention can be worn around the neck of an individual (front or back), hidden within the collar of a shirt or jacket worn by the individual, or worn in an open and obvious manner, as in the case of a necklace. In this manner, at the discretion of the wearer, the apparatus can optionally be worn in a manner so that it cannot be seen by others, or worn in an open and obvious manner.

By utilizing a plurality of quick-connect interface ports disposed around the loop member, embodiments of the present invention can selectively receive a plurality of external audio transducer modules to allow easy reconfiguration of the wearable personal audio apparatus. By incorporating audio transducers embedded within the loop member, embodiments of the present invention can be utilized in a stealth-like manner. Alternate switching mechanisms and visual indicators can be provided to assist in the use of the invention.

It is noted that the present invention may be used in a wide variety of different constructions encompassing many alternatives, modifications, and variations which are apparent to those with ordinary skill in the art. Accordingly, the present invention is intended to embrace all such alternatives, modifications, and variations as fall within the spirit and broad scope of the appended claims.

What is claimed is:

1. For use with an audio circuit, a wearable personal audio apparatus comprising:
   a wearable U-shaped loop member adapted to fit an individual in any of a plurality of positions on the individual's body, the plurality of positions including at least a first position around a forehead of the individual; and
   a plurality of quick connect interface ports disposed around the loop member to selectively receive a plurality of external audio transducer modules and to provide a respective communication path between each of the external audio transducer modules and the audio circuit.

2. The wearable personal audio apparatus of claim 1 further comprising an audio circuit wherein the audio circuit is external to the loop member.

3. The wearable personal audio apparatus of claim 1 further comprising an audio circuit wherein the audio circuit is contained within the loop member.

4. The wearable personal audio apparatus of claim 1 further comprising at least two external audio transducer modules adapted to be received in said interface ports.

5. The wearable personal audio apparatus of claim 4 wherein at least four audio transducer modules are provided, two of said modules containing audio input transducers and two of said modules containing audio output transducers.

6. The wearable personal audio apparatus of claim 1 wherein at least one of the external audio transducer modules includes an audio output device which produces an acoustic pressure wave in response to an audio signal provided by the audio circuit.

7. The wearable personal audio apparatus of claim 1 wherein at least one of the audio transducer modules includes an audio input device which produces an audio signal representative of an acoustic pressure wave received thereby for communication to the audio circuit.

8. The wearable personal audio apparatus of claim 1 wherein a first plurality of the quick connect interface ports is designated for receiving audio output device modules, and wherein a second plurality of the quick connect interface ports is designated for receiving audio input device modules.

9. The wearable personal audio apparatus of claim 1 wherein the plurality of positions includes at least a second position around the neck of the individual.

10. The wearable personal audio apparatus of claim 9 wherein a first pair of the quick connect interface ports are located on generally opposite sides of the neck and are proximate to the individual's collarbone when worn in the second position, the first pair of quick connect interface ports for receiving a pair of audio input device modules.

11. The wearable personal audio apparatus of claim 10 wherein a second pair of the quick connect interface ports are located on generally opposite sides of the neck and rearward from the individual's collarbone when worn in the second position, the second pair of quick connect interface ports for receiving a pair of audio output device modules.

12. The wearable personal audio apparatus of claim 1 wherein the loop member includes two earpieces which rest on a portion of the individual's ears in the first position.

13. The wearable personal audio apparatus of claim 12 wherein a first of the quick connect interface ports is located within a first of the two earpieces and a second of the quick connect interface ports is located within a second of the two earpieces.

14. The wearable personal audio apparatus of claim 13 wherein the plurality of positions includes at least a third position around the top of the head of the individual.

15. The wearable personal audio apparatus of claim 14 wherein the first and the second of the quick connect interface ports are located on inner portions of the two earpieces to receive a pair of audio output devices, wherein the pair of audio output devices are proximate to the individuals ears when worn in the second position to thereby provide a headphone.

16. The wearable personal audio apparatus of claim 1 wherein the loop member includes a loop-receiving member for mounting thereto a like loop member from a like wearable personal audio apparatus.

17. The wearable personal audio apparatus of claim 16 wherein the audio circuit communicates with an audio transducer of the like wearable personal audio apparatus when the like loop member is mounted to the loop-receiving member.

18. The wearable personal audio apparatus of claim 16 further comprising an interface port which connects to a mating interface port of the like wearable personal audio apparatus when the like loop member is mounted in the loop-receiving member to provide a communication path between the audio circuit and an audio transducer of the like wearable personal audio apparatus.

19. The wearable personal audio apparatus of claim 1 wherein the plurality of positions includes at least a fourth position around the back of the head of the individual.

20. The wearable personal audio apparatus of claim 1 further comprising a signal indicating member positioned on said loop member for indicating when said audio apparatus is in use.

21. The wearable personal audio apparatus of claim 2 further comprising wireless communication means for electronically connecting said interface ports with said audio circuit.

22. The wearable personal audio apparatus of claim 1 further comprising an eyewear-receiving member on said loop member which selectively receives an eyewear insert to provide eyewear when said loop member is worn in said first position.

23. For use with a plurality of audio transducers, a wearable personal audio apparatus comprising:
   a wearable arcuate loop member adapted to fit an individual in a plurality of positions on the individual's body, including a first position around a forehead of the individual and a second position around the neck of the individual, the loop member having an eyewear-receiving portion which selectively receives an eyewear insert to provide eyewear when the loop member is worn around the forehead of the individual; and an audio circuit to communicate audio signals with the plurality of audio transducers;

wherein the audio circuit is contained within the loop member.

24. The wearable personal audio apparatus of claim 23 wherein at least one of the audio transducers includes an audio output device which produces an acoustic pressure wave in response to an audio signal provided by the audio circuit.

25. The wearable personal audio apparatus of claim 23 wherein at least one of the audio transducers includes an audio input device which produces an audio signal representative of an acoustic pressure wave received thereby for communication to the audio circuit.

26. The wearable personal audio apparatus of claim 23 wherein the audio transducers are disposed within the loop member.

27. The wearable personal audio apparatus of claim 23 wherein said plurality of audio transducers includes a first plurality of audio input devices positioned in said loop member and a second plurality of sets of audio output devices positioned in said loop member, said audio input devices being positioned at least at two spatially separated positions on said loop member in order to receive audio input from said individual depending on where the audio apparatus is worn on the individual's body.

28. The wearable personal audio apparatus of claim 27 further comprising a switch mechanism for allowing said individual to selectively activate and deactivate said audio input and audio output devices.

29. The wearable personal audio apparatus of claim 27 further comprising a signal indicating device positioned on said loop member for indicating when said audio apparatus is in use.

30. The wearable personal audio apparatus of claim 27 further comprising extendable connector means for extendably connecting at least one of said audio input devices to said loop member.

31. The wearable personal audio apparatus of claim 27 wherein said plurality of audio transducers includes a first plurality of audio input devices positioned in said loop member and a second plurality of sets of audio output devices positioned in said loop member, said audio input devices being positioned at least at two spatially separated positions on said loop member in order to receive audio input from said individual depending on where said audio output device is worn on the individual's body.

32. wearable personal audio apparatus of claim 23 wherein the loop member includes an arcuate member and a pair of side support members jointed thereto, wherein the eyewear-receiving member is disposed on the arcuate member.

33. The wearable personal audio apparatus of claim 32 wherein the audio circuit communicates the audio signals between the arcuate member and at least one of the pair of side support members.

34. For use with a plurality of audio transducers, a wearable personal audio apparatus comprising:

a wearable loop member adapted to fit an individual in a plurality of positions on the individual's body, including a first position around a forehead of the individual, the loop member having an eyewear-receiving member which selectively receives an eyewear insert to provide eyewear when the loop member is worn around the forehead of the individual; and an audio circuit contained within the loop member to communicate audio signals with the plurality of audio transducers, wherein the loop member includes a loop-receiving member for mounting thereto a like loop member from a like wearable personal audio apparatus.

35. The wearable personal audio apparatus of claim 34 wherein the audio circuit communicates with an audio transducer of the like wearable personal audio apparatus when the like loop member is mounted to the loop-receiving member.

36. The wearable personal audio apparatus of claim 34 further comprising an interface port which connects to a mating interface port of the like wearable personal audio apparatus when the like loop member is mounted in the loop-receiving member to provide a communication path between the audio circuit and an audio transducer of the like wearable personal audio apparatus.

37. For use with a plurality of audio transducers, a wearable personal audio apparatus comprising:

a wearable loop member adapted to fit an individual in a plurality of positions on the individual's body, including a first position around a forehead of the individual, the loop member having an eyewear-receiving member which selectively receives an eyewear insert to provide eyewear when the loop member is worn around the forehead of the individual; and an audio circuit to communicate audio signals with the plurality of audio transducers, wherein said loop member is adapted to fit said individual in a second position around the neck of the individual.

38. For use with a plurality of audio transducers, a wearable personal audio apparatus comprising:

a wearable loop member adapted to fit an individual in a plurality of positions on the individual's body, including a first position around a forehead of the individual, the loop member having an eyewear-receiving member which selectively receives an eyewear insert to provide eyewear when the loop member is worn around the forehead of the individual; and an audio circuit to communicate audio signals with the plurality of audio transducers, wherein said loop member is adapted to fit said individual in a second position around the top of the head of the individual.

39. For use with a plurality of audio transducers, a wearable personal audio apparatus comprising:

a wearable loop member adapted to fit an individual in a plurality of positions on the individual's body, including a first position around a forehead of the individual, the loop member having an eyewear-receiving member which selectively receives an eyewear insert to provide eyewear when the loop member is worn around the forehead of the individual; and an audio circuit to communicate audio signals with the plurality of audio transducers, wherein said loop member is adapted to fit said individual in a plurality of positions on the head and neck of the individual.

40. For use with an audio circuit, a wearable personal audio apparatus comprising:

a wearable arcuate loop member adapted to fit an individual in any of a plurality of positions on the individual's head and neck, the plurality of positions including a first position around a forehead of the individual and a second position around the neck of the individual;

a plurality of internal audio transducers disposed within the loop member, the plurality of internal audio transducers including at least one of an audio output device which produces an acoustic pressure wave in response to an audio signal provided by the audio circuit and an audio input device which produces an audio signal representative of an acoustic pressure wave received thereby for communication to the audio circuit;

wherein said loop member includes an eyewear-receiving portion for selectively receiving an eyewear insert to provide eyewear when the loop member is worn around the forehead of the individual.

41. The wearable personal audio apparatus of claim 40 wherein the audio circuit is external to the loop member.

42. The wearable personal audio apparatus of claim 41 wherein said audio circuit communicates with said loop member by wireless communication means.

43. The wearable personal audio apparatus of claim 40 further comprising an audio circuit contained within the loop member.

44. The wearable personal audio apparatus of claim 40 wherein a first pair of the internal audio transducers are located on generally opposite sides of the neck and are proximate to the individual's collarbone when worn in the second position, the first pair of internal audio transducers including a pair of audio input devices which produce audio signals representative of acoustic pressure waves received thereby.

45. The wearable personal audio apparatus of claim 44 wherein a second pair of the internal audio transducers are located on generally opposite sides of the neck and rearward from the individual's collarbone when worn in the second position, the second pair of internal audio transducers including a pair of audio output devices which produce acoustic pressure waves representative of audio signals applied thereto.

46. The wearable personal audio apparatus of claim 40 wherein the loop member includes two earpieces which rest on a portion of the individual's ears in the first position.

47. The wearable personal audio apparatus of claim 46 wherein said earpieces are extendably connected to said loop member.

48. The wearable personal audio apparatus of claim 46 wherein said audio output devices are extendably connected to said loop member.

49. The wearable personal audio apparatus of claim 48 wherein the plurality of positions includes a third position around the top of the head of the individual.

50. The wearable personal audio apparatus of claim 49 wherein the plurality of audio transducers includes a pair of audio output devices, a first of the pair of audio output devices located within a first of the two earpieces and a second of the pair of the audio output devices located within a second of the two earpieces so that the pair of audio output devices are proximate to the individual's ears when worn in the second position to thereby provide a headphone.

51. The wearable personal audio apparatus of claim 40 wherein the loop member includes a loop-receiving member for mounting thereto a like loop member from a like wearable personal audio apparatus.

52. The wearable personal audio apparatus of claim 51 further comprising an interface port which connects to a mating interface port of the like wearable personal audio apparatus when the like loop member is mounted in the loop-receiving member to provide a communication path between the audio circuit and an audio transducer of the like wearable personal audio apparatus.

53. The wearable personal audio apparatus of claim 51 wherein the audio circuit communicates with an audio transducer of the like wearable personal audio apparatus when the like loop member is mounted to the loop-receiving member.

54. For use with an audio circuit, a wearable personal audio apparatus comprising:

a wearable arcuate loop member adapted to fit an individual in any of a plurality of positions on the individual's body;

at least one quick connect interface port disposed on the loop member to selectively connect the loop member to at least one external module to provide at least one communication path between the external module and the loop member; and at least one indicator disposed on the loop member and in communication with at least one communication path to provide control information to the indicator.

55. The audio apparatus of claim 54 wherein the indicator comprises a visual indicator.

56. The audio apparatus of claim 54 wherein the indicator comprises an LCD display.

57. The audio apparatus of claim 54 wherein the indicator comprises at least one light emitting element.

58. The audio apparatus of claim 57 wherein the light emitting element is an LED.

59. The audio apparatus of claim 54 wherein the indicator comprises at least two indicators disposed on opposite outwardly facing sides of the loop member.

60. The audio apparatus of claim 54 wherein the indicator automatically provides information to observers based on activity on the at least one communication path.

61. The audio apparatus of claim 54 wherein the indicator is controllable by the individual to provide selected information to observers.

62. The audio apparatus of claim 54 wherein the indicator provides information indicative of a type of signal present on at least one of the communications paths.

63. The audio apparatus of claim 54 wherein the indicator provides information indicative of signal strength of signals on at least one of the communications paths.

64. The audio apparatus of claim 54 wherein the indicator provides information indicative of signal origin for signals on at least one of the communication paths.

65. The audio apparatus of claim 54 wherein the indicator comprises an audio indicator.

66. The audio apparatus of claim 65 wherein the indicator is automatically activated based on signals on at least one communication path.

67. The audio apparatus of claim 65 wherein the indicator is controllable by the individual to provide information selected by the individual to observers.

68. The audio apparatus of claim 65 wherein the indicator generates sound having intensity based on activity on at least one communication path.

* * * * *

UNITED STATES PATENT AND TRADEMARK OFFICE
CERTIFICATE OF CORRECTION

| | | |
|---|---|---|
| PATENT NO. | : 6,091,832 | Page 1 of 1 |
| APPLICATION NO. | : 08/909402 | |
| DATED | : July 18, 2000 | |
| INVENTOR(S) | : Shurman et al. | |

It is certified that error appears in the above-identified patent and that said Letters Patent is hereby corrected as shown below:

On the face page, in field (56), under "U.S. Patent Documents", insert -- 3,247,300 * 4/1966 Hinman --.

On the face page, in field (56), under "3,586,977", insert -- 3,604,861 9/1971 Lewis et al. ...... 179/107 -- and -- 3,789,163 1/1974 Dunlavy...... 179/107 --.

On the face page, in field (56), under "5,841,859", insert -- * cited by examiner --.

Signed and Sealed this

Eighth Day of June, 2010

David J. Kappos
*Director of the United States Patent and Trademark Office*